US007753574B2

(12) United States Patent
Meyrenaud

(10) Patent No.: US 7,753,574 B2
(45) Date of Patent: Jul. 13, 2010

(54) OPTICAL MODULE FOR AN ELLIPTICAL LIGHTING DEVICE ADAPTED TO A GIVEN VOLUME FOR A MOTOR VEHICLE

(75) Inventor: Jean-Luc Meyrenaud, Livry Gargan (FR)

(73) Assignee: Valeo Vision, Bobigny (FR)

( * ) Notice: Subject to any disclaimer, the term of this patent is extended or adjusted under 35 U.S.C. 154(b) by 124 days.

(21) Appl. No.: 12/114,212

(22) Filed: May 2, 2008

(65) Prior Publication Data

US 2008/0273347 A1 Nov. 6, 2008

(30) Foreign Application Priority Data

May 4, 2007 (FR) .................................. 07 03267

(51) Int. Cl.
*B60Q 1/14* (2006.01)

(52) U.S. Cl. ...................................... 362/539; 362/518

(58) Field of Classification Search ................. 362/518, 362/538, 539
See application file for complete search history.

(56) References Cited

U.S. PATENT DOCUMENTS 1,734,834 A 11/1929 Steward et al.
4,858,090 A 8/1989 Downs
7,073,929 B2 7/2006 Iwasaki
7,178,960 B2 * 2/2007 Ishida ........................ 362/545
2001/0021112 A1 * 9/2001 Taniuchi et al. ............ 362/518
2005/0248956 A1 11/2005 Iwasaki

FOREIGN PATENT DOCUMENTS

EP 1571392 A 9/2005
FR 2489930 A 3/1982

* cited by examiner

*Primary Examiner*—David V Bruce
(74) *Attorney, Agent, or Firm*—Jacox, Meckstroth & Jenkins

(57) ABSTRACT

An optical module for an elliptical motor vehicle lighting device, the optical module comprising in particular a reflector, a light source emitting light rays, and a projection lens, the reflector having a reflecting internal face for reflecting towards the projection lens at least some of the light rays emitted by the light source. The internal face of the reflector is formed by the joining of at least a first portion of a first ellipsoid shape and a second portion of a second ellipsoid shape, the first ellipsoid shape having a first principal focus and a second principal focus, the second ellipsoid shape having a first principal focus and a second principal focus, the second principal focus of the first ellipsoid shape being merged with the first principal focus of the second ellipsoid shape.

10 Claims, 3 Drawing Sheets

OPTICAL MODULE FOR AN ELLIPTICAL LIGHTING DEVICE ADAPTED TO A GIVEN VOLUME FOR A MOTOR VEHICLE

BACKGROUND OF THE INVENTION

1. Field of the Invention

The field of the invention is, in general terms, that of motor vehicle headlamps.

2. Description of the Related Art

In this field, various types of device are known, intended for illuminating the road or for signalling, among which there are essentially:

tail lights of low intensity and range;

long-range headlights, or high beam lighting devices, and supplementary lighting devices of the long-range type, whose area of vision on the road is around 200 meters and must be switched off when passing another vehicle in order not to dazzle its driver; these are beams without cutoff;

fog lights;

passing beam or low beam lighting devices, of high intensity and with a range on the road of around 70 meters;

improved headlamps, referred to as dual function, which combine the functions of low beams and high beam incorporating a removable shade;

signalling devices, for example of the turn indicator type etc. indicator type etc.

There exist two main families of optical module, which correspond to two distinct arrangements of the different elements, and which are able to act in the device according to the invention. Optical module means an optical system comprising at least one light source, for example a halogen lamp or a xenon lamp, disposed in a reflector, and which is preferably self-contained, that is to say which is able to be switched on or off separately from the other optical modules of the lighting device in which it is installed if the latter comprises several optical modules.

The two main families of optical modules are as follows:

The first family is that of so-called elliptical optical modules. In this type of optical module, a light concentration spot is generated by a light source disposed in a mirror, or reflector. Typically, the light source is disposed at the first focus of an ellipsoid-shaped mirror, the spot forming at the second focus, or image focus, of the mirror. The light concentration spot is then projected onto the road by a convergent lens, for example a lens of the plano-convex type.

The second family is that of so-called parabolic optical modules. In this type of optical module, a light beam is generated by a small light source disposed in a reflector, or mirror. The projection onto the road of the light rays reflected by a suitable reflector makes it possible to obtain directly a light beam complying with the various constraints imposed by standards. This family of optical module includes so-called free-surface, or complex-surface, headlamps, which make it possible to obtain directly a light beam having a desired cutoff line.

The present invention is more particularly adapted to lighting devices of the first family.

In the prior art, a lighting device of the generic elliptical type is typically of the same type as that depicted in FIG. 1. FIG. 1 depicts a view in section and from the side of a low beam lighting device 100 that comprises essentially a reflector 101, roughly ellipsoidal in shape, a light source 102 emitting a plurality of light rays 103 and disposed in the vicinity of the top of the reflector 101, and an exit surface 104, for example an outer lens made from plastics material, for a light beam 106. Before reaching the exit surface 104, the light rays

103 are caused to pass, either directly, or after reflection on the reflector 101, through a projection lens 105, characterized by an entry face 110 and an exit face 111. It projects the light beam 106, whose orientation and range depend in particular on the arrangement and optical characteristics of the projection lens 105, the shape of the reflector 101, the position of the light source 102 within the reflector 101 and the possible presence of a shade and the position thereof. Preferably, a central part of the light source 102 is disposed in the focal area of a first focus F1 of the reflector 101, and the object focus of the projection lens 105 is situated in the focal area of a second focus F2 of the reflector 101. Thus any light ray 103 emitted by the central part of the light source 102 passes through the second focus F2 of the reflector 101 and leaves the projection lens 105 horizontally.

In this example, a shade 108 is interposed between the reflector 101 and the projection lens 105. The shade 108 is disposed in a plane parallel to the projection lens 105, approximately level with the object focal plane of the projection lens 105, so that the image of the shade 108 is emitted to infinity. By virtue of the presence of such a shade 108, the light beam 106 that is effectively emitted by the lighting device 100 is not emitted above a cutoff line determined by the shape of a top part 109 of the shade 108.

Having a light source disposed, in the direction of its length, in line with the foci F1 and F2 of the reflector 101 gives a particularly elongated shape to the reflector 101. Moreover, the fact that it is necessary, for thermal reasons, to keep a certain distance between the projection lens 105 and the exit lens contributes to the elongate shape of the lighting device in question. Thus the general size of conventional elliptical lighting devices of the prior art is great in the direction of their length. They therefore require, in the vehicle in which they are intended to be placed, great depth. Such a spatial size thus does not make it possible to adapt to locations where the available space is reduced in depth; however, such considerations, in particular because of changes in the requirements of manufacturers, in particular in terms of style, are more and more frequent.

A problem is therefore posed for the design of certain lighting devices, the volumes that are reserved for them now having less conventional shapes than previously.

SUMMARY OF THE INVENTION

The object of the present invention is an optical module for an elliptical lighting device adapted to a given available volume and placed within a motor vehicle. The elliptical module according to the invention is intended to be integrated in a lighting device for a motor vehicle, in particular of the low beam type. The aim of the invention is essentially to propose a solution for adapting the shape of a lighting device to an environment requiring reproduction of a non-conventional form of elliptical module.

The object of the invention proposes a solution to the problems that have just been disclosed. In the invention, the production of an optical module is proposed having a reflector whose reflective surface results from the juxtaposition of particular surfaces so that the reflector can be contained in unusual volumes, in particular elongated in height and reduced in depth compared with the volumes occupied by the lighting devices of the prior art. To this end, it is proposed in particular that the reflector be formed by the joining of at least two ellipsoidal portions, foci of these ellipsoids being merged. The light source is then no longer disposed in the direction of the length of the lighting device that it equips. Advantageously, the light source disposed within the reflector can then have an orientation that facilitates access thereto, for example for lamp replacement operations.

The invention therefore concerns essentially an optical module for an elliptical motor vehicle lighting device, the optical module comprising in particular a reflector, a light source emitting light rays, and a projection lens, the reflector having a reflecting internal face for reflecting towards the projection lens at least some of the light rays emitted by the light source, such that the internal face of the reflector is formed by the joining of at least a first portion of a first ellipsoid shape and a second portion of a second ellipsoid shape, the first ellipsoid shape having a first principal focus and a second principal focus, the second ellipsoid shape having a first principal focus and a second principal focus, the second principal focus of the first ellipsoid shape being merged with the first principal focus of the second ellipsoid shape. The second portion of ellipsoid shape thus allows the reflection towards the projection lens of some of the light rays emitted by the light source and reflected by the first portion of ellipsoid shape.

It is considered here that two principal foci, or more generally two points, are merged if one of the two principal foci is situated within a circle having the other principal focus at its center, and a diameter of the size of the image of the light source (used in the reflector) at this other principal focus. This makes it possible to define a distance interval between the two principal foci so that they can be considered to be merged. This interval is a function of the light source used. For example, this distance may be a few millimeters and rarely exceeds two centimeters.

In very general terms, it can thus be considered that the invention concerns a lighting device for a vehicle of the elliptical module type, where the reflector is composed of one or more parts, and where light rays issuing from the source come to be reflected twice rather than only once before passing through the projection lens, and then emerging from the module through the closure lens in order to constitute the light beam (if the reflector is in several parts, the double reflection takes place on the same part).

Apart from the main characteristics that have just been mentioned in the previous paragraph, the optical module according to the invention can have one or more additional characteristics among the following:

the second principal focus of the second ellipsoid shape and the first principal focus of the first ellipsoid shape constitute the principal foci of a third ellipsoid shape, a portion of which contributes to the formation of the internal face of the reflector;

the portion of the third ellipsoid shape contributing to the formation of the internal face of the reflector is disposed between the first portion and the second portion of ellipsoid shape;

the first portion of ellipsoid shape has as its main function the recovery of a maximum amount of light flux emitted by the light source; the main function of the second portion of ellipsoid shape is to provide a satisfactory range for the light being produced by the optical module; and the main function of the third portion of ellipsoid shape is to provide a spread of the light being produced by the optical module;

the second portion of ellipsoid shape is extended by a complementary portion of reflecting surface able to reflect towards the projection lens some of the light rays emitted by the light source;

the second principal focus of the second ellipsoid shape is merged with the object focus of the projection lens;

the light source is disposed in the vicinity of the first principal focus of the first ellipsoid shape;

the light source is disposed on a horizontal plane;

the filament of the light source is positioned in a direction different from the direction of the optical axis of the elliptical lighting device;

the light source is disposed on a vertical plane;

the filament of the light source is oriented in a direction roughly opposite to a direction of emission of the elliptical lighting device, forming an angle of between 30 degrees and 90 degrees with the optical axis, in particular 86 degrees;

the optical module comprises a shade for intercepting some of the light rays reflected by the reflector, the shade being disposed in the vicinity of the object focus of the projection lens;

at least two of the portions of ellipsoid shape constituting the internal face of the reflector are distinct pieces.

The various additional characteristics of the device according to the invention, in so far as they are not mutually exclusive, are combined according to all possibilities of association in order to result in different example embodiments of the invention.

The present invention also relates to a motor vehicle equipped with a lighting device comprising an optical module according to the invention, with its principal characteristics and possibly one or more supplementary characteristics that have just been mentioned.

The invention and its various applications will be understood better from a reading of the following description and an examination of the figures that accompany it.

BRIEF DESCRIPTION OF THE ACCOMPANYING DRAWINGS

These are presented only by way of indication and are in no way limitative of the invention. The figures show:

FIG. 1, already described, is an example embodiment of an optical module of the prior art;

DETAILED DESCRIPTION OF THE PREFERRED EMBODIMENTS

The various elements appearing in several figures will, unless otherwise specified, have kept the same reference. The concepts of direction and position of the "top", "bottom", "vertical", "horizontal" etc type are mentioned under conventional conditions of use of the optical module according to the invention once it is disposed in a lighting device mounted on a motor vehicle.

Figure 1:
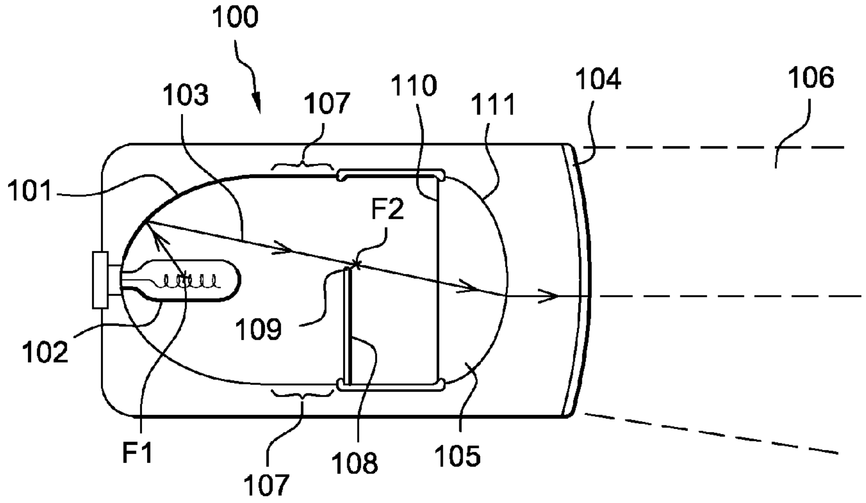
Fig. 1 PRIOR ART
Figure 2:
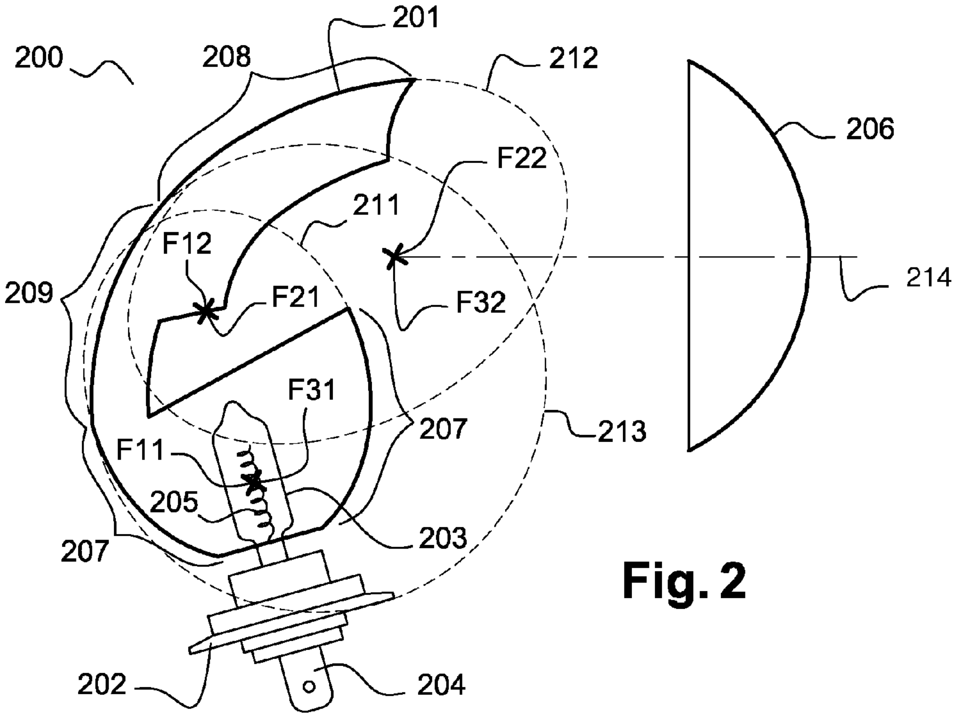
FIG. 2 is a first example embodiment of the optical module according to the invention.

FIG. 2 shows a first example of an optical module 200 according to the invention. It comprises a projection lens 206, and a reflector 201, within which there is positioned a light source 202, consisting essentially of a lamp 203, a lamp support 204 and a filament 205. In the examples considered, the lamps shown comprise filaments. The object of the invention obviously extends to optical modules involving other types of light source, in particular light emitting diodes, or LEDs, or xenon lamps; in the latter case, the filament 205 is replaced by an electric arc generating light rays.

The projection lens 206 is characterized by a central axis 214, passing through the object focus and the image focus of the projection lens 206, thus corresponding to the optical axis of the lighting device in which the optical module 200 is intended to be positioned. The example shown corresponds to a view from above; thus, in this example, the light source 202 is positioned on a horizontal plane, the filament 205 being contained in this horizontal plane.

The reflecting surfaces of the reflector 201 involved in the various example embodiments that will be described in the remainder of the document will be defined in particular with reference to surfaces defined from the term ellipsoid. In general terms, an ellipsoid, designating here an ellipsoid of revolution, is a volume generated by the rotation of an ellipse about one of its axes. Thus any planar section of an ellipsoid is an ellipse. In the present document, reference is made to the expression "ellipsoid shapes" in order to designate a shape in question, the closest known generic mathematical representation of which is the ellipsoid. As is known, an ellipsoid has three principal ellipses, corresponding to the intersection of the principal planes of the ellipsoid with the ellipsoid. Principal focus of an ellipsoid means each of the foci of the principal ellipses of an ellipsoid. Two distinct ellipsoids having a principal focus in common are said to be conjugate. The expression "principal focus of an ellipsoid shape" designates a point situated in the immediate vicinity of a principal focus of the ellipsoid most approaching the ellipsoid shape in question.

In the example depicted, the reflector 201 is formed by the joining of three distinguishable parts:

a first part 207 consists of a portion of a first ellipsoid shape 211, designated as the first portion, characterized by a first principal focus F11 and a second principal focus F12; the filament 205 of the lamp 203 is approximately centered on the first principal focus F11;

a second part 208 consists of a portion of a second ellipsoid shape 212, designated as the second portion, characterized by a first principal focus F21 and a second principal focus F22; according to the invention, the first ellipsoid shape 211 and the second ellipsoid shape 212 are conjugate, that is to say the first principal focus F21 of the second ellipsoid shape 212 and the second principal focus F12 of the first ellipsoid shape 211 are merged;

a third part 209 consists of a portion of a third ellipsoid shape 213, designated as the third portion, characterized by a first principal focus F31 and a second principal focus F32; the third part 209 provides the continuity, between the first part 207 and the second part 208 previously mentioned, of the reflecting surface of the reflector 201. In the example shown, the third ellipsoid shape 213 is conjugate with the first ellipsoid shape 211 and the second ellipsoid shape 212: on the one hand the first principal focus F11 of the first ellipsoid shape 211 and the first principal focus F31 of the third ellipsoid shape 213 are merged; on the other hand, the second principal focus F22 of the second ellipsoid shape 212 and the second principal focus F32 of the third ellipsoid shape 213 are merged; the latter foci are, in the examples shown, merged with the object focus of the projection lens 206.

In the example depicted, the reflecting surface therefore results from the association of three portions of ellipsoid shapes. In other embodiments, not shown, the portions of the first two ellipsoid shapes are simply combined; the result obtained is then of lower performance in terms of recuperation of light flux but is sufficient to meet the requirements of standards. In practice, the portions of ellipsoid shapes consist in fact of portions of planes that are juxtaposed in order to form a surface close to that of an ellipsoid; thus the terms "portions of ellipsoid shape" must encompass, within the meaning of the invention, these types of embodiment.

Figure 3:
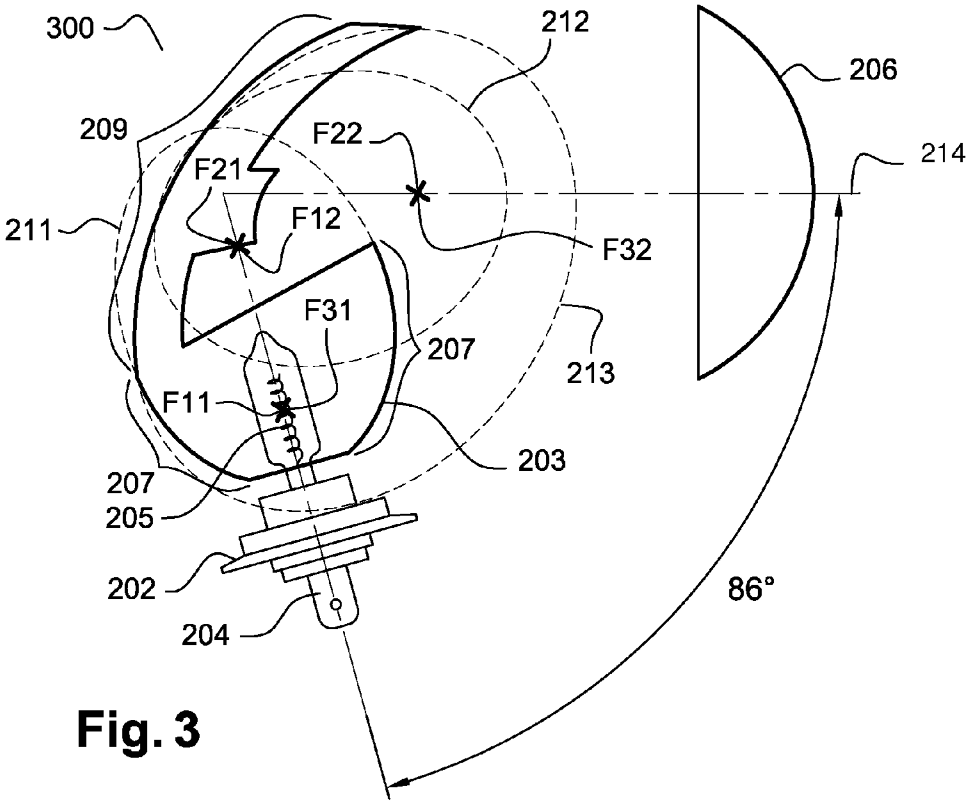
FIG. 3 is a first variant of a second example embodiment of the module according to the invention.
Figure 4:
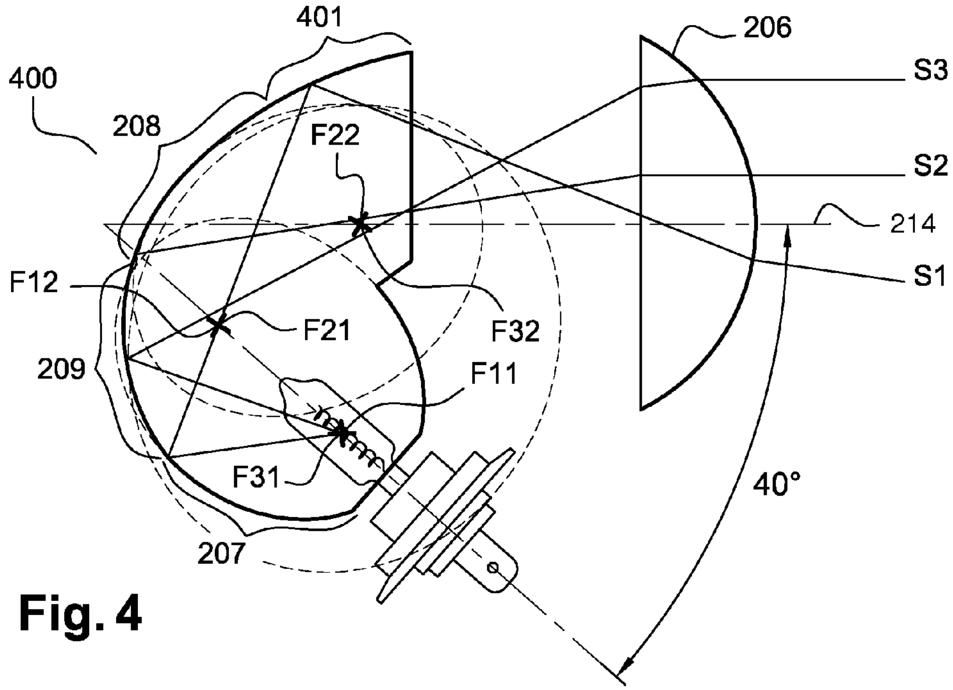
FIG. 4 is a second variant of a second example embodiment of the module according to the invention.

FIGS. 3 and 4 show a second example embodiment of the invention, shown in side view, in a first variant and a second variant referenced respectively 300 and 400. Thus, in this second example, the light source 202 is positioned on a vertical plane, the filament 205 being contained in this vertical plane. The difference between FIG. 3 and FIG. 4 results from a variation in the inclination of the light source 202: in FIG. 3, the principal axis—corresponding to the axis of the filament 205, passing through the first and second principal foci F11 and F12 of the first ellipsoid shape 211—forms an angle of 86 degrees with the central axis 214, whereas in FIG. 4 this angle is 40 degrees.

In all the examples depicted, it can be seen that the orientation of the light source 202 is roughly opposite to the direction of final emission of the light beam emerging from the projection lens 206. Roughly opposite direction means the fact that the half line extending the filament 205 in the direction opposite to that of the support of the light source 202, or, in the case of a discharge lamp, comprising the axis joining the two electrodes and extending in the direction opposite to that of the support of the light source 202, or, in the case of an LED, corresponding to the mean direction of emission of the light from the LED, would never pass through a plane defined as the plane comprising the entry face of the projection lens 206. For example, in the case of a lambertian LED the mean direction of emission of light from the LED is the half-perpendicular to the plane of the semiconductor and which extends in the direction opposite to the illuminating surface of the semiconductor.

Moreover, as can be seen in FIG. 4, the second part 208 is supplemented by a complementary portion 401 of a reflecting surface able to reflect towards the projection lens 206 some of the light rays emitted by the light source 202.

FIG. 4 depicts various light rays in order to show the contribution of each of the portions of the ellipsoid shapes involved in the example depicted.

A first ray S1, passing through the first principal focus F11, is reflected by the first part 207 before passing through the second principal focus F12; the first ray S1 then reaches the complementary portion 401, which returns the first ray S1 towards the projection lens 206. It can be remarked here that, without the presence of the complementary portion 401, the first ray S1 would not contribute to the light being produced by the lighting device in which the optical module 400 is disposed.

A second ray S2, passing through the first principal focus F11 and oriented along the axis of the filament 205, passes through the first principal focus F21 and is then reflected by the second part 208 before passing through the second principal focus F22; the second ray S2 then passes through the projection lens 206 in order to emerge from the projection lens 206 in a roughly horizontal direction.

A third ray S3, passing through the first principal focus F31, is reflected by the third part 209 before passing through the second principal focus F32; the third ray S3 then passes through the projection lens 206 in order to emerge from the projection lens 206 in a roughly horizontal direction.

In practice, the main function of the first part 207 of ellipsoid shape is to recover a maximum amount of light flux, possibly in cooperation with the complementary portion 401; the main function of the second part 208 of ellipsoid shape is to provide a satisfactory range for the light being produced; the main function of the third part 209 of ellipsoid shape is to provide a spreading of the light beam produced.

An essential difference between the example in FIG. 2 and the examples in FIGS. 3 and 4 lies in the global shape of the light being produced, roughly rounded in shape in the first example, and roughly rectangular in shape in the second example.

Figure 5:
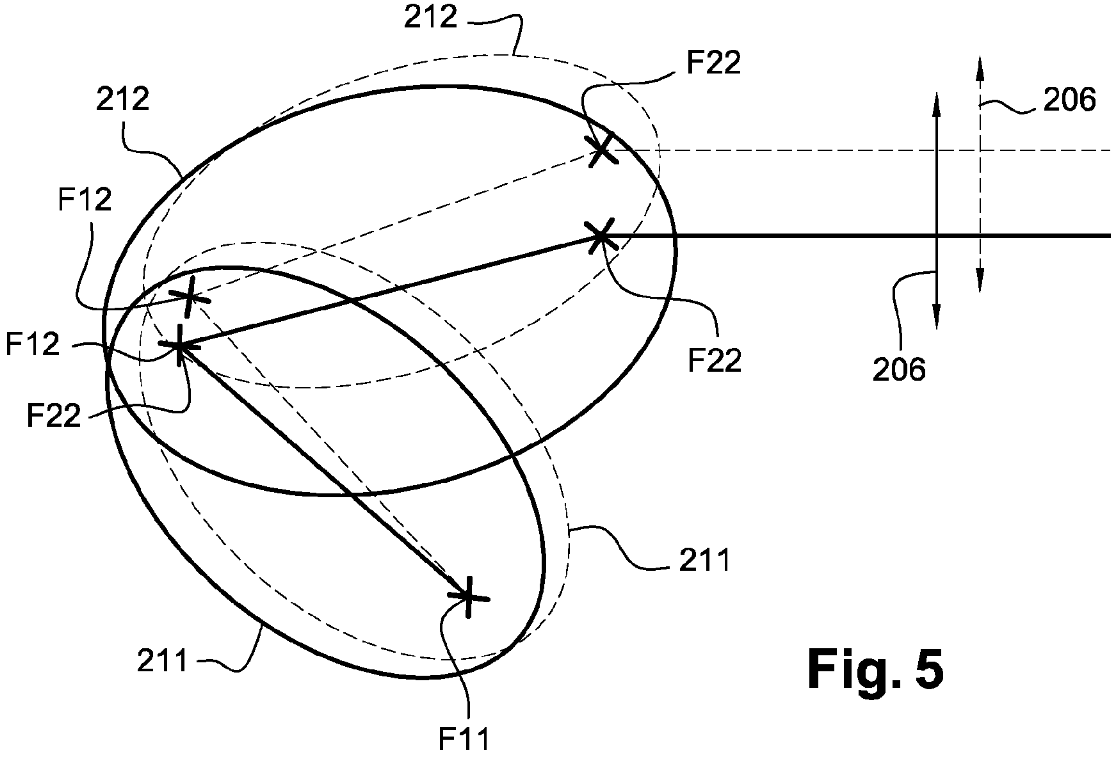
FIG. 5 is a first schematic representation of various possible arrangements of ellipsoidal portions forming the reflector of the optical module according to the invention.

FIG. 5 is a schematic representation illustrating the fact that, by complying with the essential characteristics of the invention, namely the combination of conjugate ellipsoid shapes in order to produce a reflecting surface of the reflector, it is possible to adapt the shape of the optical module according to the constraints relating to the space available. Thus FIG. 5 shows in solid lines a first arrangement of the first ellipsoid shape 211 and the second ellipsoid shape 212 adapted to cooperate optimally with a first position of the projection lens 206. FIG. 5 also shows in dotted lines a second arrangement of the first ellipsoid shape 211 and second ellipsoid shape 212 adapted to cooperate optimally with a second position of the projection lens 206. The change from the first arrangement to the second arrangement takes place by a rotation about an axis perpendicular to the plane of the figure passing through the first principal focus F11 of the first ellipsoid shape 211. Such a rotation causes the movement of the first principal focus F21 of the second ellipsoid shape 212. The second principal focus F22 of the second ellipsoid shape 212 is then also moved, its position then being defined, in this example, so that the first principal focus F11 of the first ellipsoid shape 211 and second principal focus F22 of the second ellipsoid shape 212 constitute the two principal foci of the third ellipsoid shape 213, not shown.

Another example, not shown, illustrating the adaptability of the optical module according to the invention according to an available volume consists of effecting a rotation of the first ellipsoid shape 211 and second ellipsoid shape 212, no longer around the first principal focus F11 but around the second principal focus F12 of the first ellipsoid shape 211, merged according to the invention with the first principal focus F21 of the second ellipsoid shape 212.

In different example embodiments, a shade is disposed at the object focus of the projection lens 206 in order to intercept some of the light rays emitted by the light source 202, possibly after reflection by the reflector 201, so as to create a cutoff line corresponding to the regulations so that the light beam produced is of the dipped-beam type. In certain examples, the shade is removable, the corresponding lighting device then being of the low/high beam dual function type.

According to the example embodiments, the reflector 201 consists of a single piece, by itself alone grouping together the various portions of ellipsoid shape, or results from the juxtaposition of different parts; these different parts do then not constitute a single piece but are distinct pieces that are joined after manufacture in order to constitute the internal face of the reflector 201; advantageously, each of the parts then corresponds to one of the ellipsoid-shaped portions described Apart from an advantage relating to strictly defined available volumes, the optical module according to the invention has various supplementary advantages:

efficiency in terms of light flux is around 60% for a low beam and approximately 65% for a high beam according to the respective light distribution, which is superior to the optical modules of the prior art;

the light source, because of its orientation in a direction roughly opposite to a direction of emission of the lighting device in which it is disposed, is made more accessible from the outside of the vehicle that is equipped with it, for example for lamp replacement operations.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An optical module for an elliptical motor vehicle lighting device, said optical module comprising: a reflector, a light source emitting light rays, and a projection lens, said reflector having a reflecting internal face for reflecting towards said projection lens at least some of said light rays emitted by said light source, wherein said reflecting internal face of said reflector is formed by the joining of at least a first portion of a first ellipsoid shape and a second portion of a second ellipsoid shape, said first ellipsoid shape having a first principal focus and a second principal focus, said second ellipsoid shape having a first principal focus and a second principal focus, said second principal focus of said first ellipsoid shape being merged with said first principal focus of said second ellipsoid shape, said second portion of an ellipsoid shape thus allowing reflection towards said projection lens of some of said light rays emitted by said light source and reflected by said first portion of the ellipsoid shape;

wherein said second principal focus of said second ellipsoid shape and said first principal focus of said first ellipsoid shape constitute principal foci of a third portion of ellipsoid shape which contributes to formation of said reflecting internal face of said reflector;

wherein said third portion of ellipsoid shape contributing to formation of said reflecting internal face of said reflector is disposed between said first portion of ellipsoid shape and said second portion of ellipsoid shape;

the main function of said first portion of ellipsoid shape is to recover a maximum amount of light flux emitted by said light source;

the main function of said second portion of ellipsoid shape is to provide a satisfactory range for a light beam produced by said optical module;

and the main function of said third portion of ellipsoid shape is to provide a spread of said light beam produced by said optical module.

2. The optical module according to claim 1, wherein said second portion of ellipsoid shape is extended by a complementary portion of reflecting surface able to reflect towards said projection lens some of said light rays emitted by said light source.

3. The optical module according to claim 1, wherein said second principal focus of said second portion of ellipsoid shape is merged with an object focus of said projection lens.

4. The optical module according to claim 1, wherein said light source is disposed in a vicinity of said first principal focus of said first portion of ellipsoid shape.

5. The optical module according to claim 1, wherein said light source is disposed on a horizontal plane.

6. The optical module according to claim 5, wherein a filament of said light source is positioned in a direction different from a direction of an optical axis of an elliptical lighting device.

7. The optical module according to claim 1, wherein said light source is disposed on a vertical plane.

8. The optical module according claim 6, wherein said filament of said light source is oriented in a direction roughly opposite to a direction of emission of said elliptical lighting device, forming an angle of between 30 degrees and 90 degrees with an optical axis.

9. The optical module according to claim 1, wherein said optical module comprises a shade for intercepting some of said light rays reflected by said reflector, said shade being disposed in a vicinity of an object focus of said projection lens.

10. The optical module according to claim 1, wherein at least two portions of ellipsoid shape constituting said reflecting internal face of said reflector are distinct pieces.

* * * * *